United States Patent [19]

Jennings, Jr.

[11] Patent Number: 5,108,226
[45] Date of Patent: Apr. 28, 1992

[54] TECHNIQUE FOR DISPOSAL OF DRILLING WASTES

[75] Inventor: Alfred R. Jennings, Jr., Plano, Tex.

[73] Assignee: Mobil Oil Corporation, Fairfax, Va.

[21] Appl. No.: 599,591

[22] Filed: Oct. 18, 1990

[51] Int. Cl.⁵ ............................................. B09B 3/00
[52] U.S. Cl. ................................ 405/128; 166/305.1; 405/53
[58] Field of Search ..................... 405/128, 129, 266; 166/305 D, 305.1, 292

[56] References Cited

U.S. PATENT DOCUMENTS

| | | | |
|---|---|---|---|
| 2,348,161 | 5/1944 | Van Duzee | 166/305 D |
| 2,707,171 | 4/1955 | Miller | 166/305 D |
| 3,380,522 | 4/1968 | Payne et al. | 166/292 X |
| 3,513,100 | 5/1970 | Stogner | 166/305 D |
| 3,722,593 | 3/1973 | Poettmann | 166/305 D |
| 3,724,542 | 4/1973 | Hamilton | 166/305 D X |
| 4,067,389 | 1/1978 | Savins | 166/246 |
| 4,378,845 | 4/1983 | Medlin et al. | 166/297 |
| 4,400,314 | 8/1983 | Ellis et al. | 405/128 X |
| 4,570,710 | 2/1986 | Stowe | 166/250 |
| 4,625,802 | 12/1986 | Sydansk | 166/305.1 X |
| 4,742,105 | 5/1988 | Kelley | 524/447 |
| 4,770,795 | 9/1988 | Giddings et al. | 252/8.514 |
| 4,787,452 | 11/1988 | Jennings, Jr. | 166/272 |
| 4,903,773 | 2/1990 | Doelschall et al. | 166/305.1 X |
| 4,921,621 | 5/1990 | Costello et al. | 252/8.513 |
| 4,942,929 | 7/1990 | Malachosky et al. | 175/66 |

*Primary Examiner*—Dennis L. Taylor
*Attorney, Agent, or Firm*—Alexander J. McKillop; Charles J. Speciale; Charles A. Malone

[57] ABSTRACT

A method for disposing of drilling wastes where an aqueous saline solution is used to disperse a drilling fluid or mud. The saline solution containing the dispersed drilling fluid or mud is injected into a disposal well or high permeability oil depleted zone. An interval of the formation adjacent to the disposal well is hydraulically fractured so as to allow continued injection of the solution containing the drilling fluid or mud at substantially low pressures. Hydraulic fracturing is used to re-establish communication with a disposal zone whenever a "skin" builds up due to filtration of the solids from the injected drilling fluids or muds.

10 Claims, No Drawings

TECHNIQUE FOR DISPOSAL OF DRILLING WASTES

FIELD OF THE INVENTION

This invention relates to the treatment of formations around a hydrocarbon production area such as oil wells, gas wells, or similar hydrocarbon-containing formations. It is particularly directed to disposal of drilling wastes produced during the drilling process.

BACKGROUND OF THE INVENTION

In order to obtain hydrocarbonaceous fluids from a productive interval of a formation, it is often necessary to drill wells so as to remove said fluids. During the drilling process, drilling fluids and drilling muds are used to facilitate the drilling process. These drilling fluids and muds are recovered and contain materials which may contaminate the environment if not disposed of properly. Conscientious efforts have been made to dispose of used drilling fluids, drilling muds, and related materials, in a manner that is as environmentally safe as possible. Sometimes the wastes are solidified in mud pits at the surface with cement slurries. Later, the slurries are covered with earth. Occasionally, the materials may be pumped into disposal wells or into a high permeability depleted oil interval of a formation. Disposal of drilling wastes offshore is particularly expensive because mud pits are non-existent and there may not be ready access to disposal wells.

In various regions, tanks are used for storing drilling fluids and cuttings because reserve pits are not permitted. In addition, removal may be required from presently existing reserve pits. In such reserve pits, used drilling fluid contents are mixed with, or contaminated by, topsoil and the material used in constructing the pits.

Therefore, what is needed is a method to avoid the expense of hauling such materials from reserve pits or tanks to hazardous waste disposal locations which may be hundreds of miles from drilling sites.

SUMMARY OF THE INVENTION

This invention is directed to a method for disposing of drilling wastes which have been obtained when drilling a hole into an underground formation to recover hydrocarbonaceous fluids therefrom. In the practice of this invention, said drilling wastes are mixed with an aqueous saline solution in an amount sufficient to make a slurry. The slurry is injected into the formation at a rate and velocity sufficient to fracture the formation. The salt concentration of the saline solution is held at a predetermined concentration so that any pre-existing immobile formation fines will remain fixed. When at least one more permeable area of the formation has been sufficiently closed, another more permeable area can be located and additional drillings wastes in slurry form can be injected while fracturing the formation.

It is therefore an object of the present invention to dispose of drilling wastes obtained while drilling holes into a formation for the recovery of hydrocarbonaceous fluids.

It is another object of this invention to use drilling wastes to close a more permeable area of a formation.

It is yet another object of this invention to deposit drilling wastes deep within a more permeable area of a formation so as to close said area.

It is a still yet further object of this invention to provide for the disposal of drilling wastes in offshore disposal sites.

It is a still even yet further object of this invention to provide for a method for disposing of drilling wastes which is readily adaptable to various geographical areas.

DESCRIPTION OF THE PREFERRED EMBODIMENTS

In the practice of this invention, an aqueous slurry containing drilling wastes is prepared. The drilling wastes used herein are obtained as a result of the process of drilling holes into the earth in order to produce hydrocarbonaceous fluids therefrom. These drilling wastes are the result of circulating a drilling mud or drilling fluid down into a wellbore productive tubing and up through an annulus during the drilling process to aid in cooling and lubricating a rotary bit. It is also used for providing a medium of lifting earthen material or so-called drilling cuttings out of the wellbore. The drilling fluid may comprise water, certain clay-like materials to increase its viscosity and density, and other conditioning agents or additives.

Ordinarily, tanks or reserve pits are used for storing the drilling fluids and cuttings. Following a suitable separation process, the recovered drilling wastes are mixed into an aqueous saline solution. A suitable method for separating drilling wastes is discussed in U.S. Pat. No. 4,942,929 which issued to Malachosky et al. on Jul. 24, 1990. This patent is hereby incorporated by reference herein.

An aqueous solution is utilized to prevent an uncontrolled migration of pre-existing formation fines into an area of lesser permeability. Fresh or relatively fresh water being foreign to the formation often causes any pre-existing quiescent fines to be dispersed from their repository or loosened from adhesion to capillary walls. If an abrupt decrease in salinity should occur, a large number of clay particles, or fines, can be released in a short time. This occurrence is avoided by the use of the saline solution herein. The effects of an abrupt decrease in salinity is discussed in U.S. Pat. No.4,570,710 which issued to Stowe and which is hereby incorporated by reference.

After making a slurry of the drilling wastes which are of a size sufficient to fit into a predetermined more permeable zone in the formation, the slurry is injected into the formation at pressures sufficient to fracture the formation. High pressure hydraulic fracturing of the more permeable interval allows the drilling wastes to be continually injected into the formation at relatively low pressures. Fracturing can also be used to re-establish communication with a disposal zone whenever a "skin" has built up within the formation due to filtration of solids from the drilling wastes. A hydraulic fracturing technique which can be used herein is discussed in U.S. Pat. No. 4,067,389 which issued to Savins on Jan. 10, 1978. Another method for initiating hydraulic fracturing is disclosed by Medlin et al. in U.S. Pat. No. 4,378,845 which issued on Apr. 5, 1983. Both patents are hereby incorporated by reference herein. As is known by those skilled in the art, in order to initiate hydraulic fracturing in a formation, the hydraulic pressure applied must exceed the formation pressure in order to cause a fracture to form. The fracture which forms will generally run perpendicular to the lease principal stress in the formation or reservoir.

Salts which can be utilized in the saline solution include salts such as potassium chloride, magnesium chloride, calcium chloride, zinc chloride and carbonates thereof, preferably sodium chloride. Additionally, produced saline formation water can also be utilized. While injecting an aqueous salt or saline solution in a concentration sufficient to prevent fines migration, and sufficient drilling fluid wastes to make a slurry, pressures applied to the wellbore cause the aqueous saline solution to be forced deep within the formation. The depth to which the slurry is forced within the formation depends upon the pressure exerted, the permeability of the formation, and the characteristics of the formation as is known to those skilled in the art. In order to allow the fines or particles to migrate deeply within the formation, the critical fluid flow velocity of the slurrified disposal waste is exceeded. This causes the slurrified disposal waste to be transported in the saline solution to a location deep within the formation. Said slurry can be injected incrementally into an injection well where slugs containing a higher concentration of disposal fines in the slurry follow a slug of lower disposal waste concentration.

As used herein, the critical fluid flow velocity is defined as the smallest velocity of the saline solution which will allow fines or small particles to be carried by the fluid and transported within the formation or reservoir. Lower velocities will not entrain particles and will permit particles to settle from the solution. A discussion of the saline concentration and the rate and velocity needed to dispose of the disposal waste is discussed by Jennings Jr. in U.S. Pat. No. 4,787,452 which issued on Nov. 29, 1988. This patent is hereby incorporated by reference herein.

A deflocculant can also be added to the saline solution. The deflocculant is added in order to "shrink" hydrated bentonite particles to facilitate mud solids disposal. Deflocculants which can be used herein include floating carbonate, sodium hydroxide, and polyacrylic salts. Other deflocculants which can be used herein include calcium tolerant deflocculants which are discussed in U.S. Pat. No. 4,770,795 which issued to Giddings et al. on Sep. 13, 1988. Binary deflocculating compositions are discussed in U.S. Pat. No. 4,742,105 which issued to Kelly on May 3, 1988. Hydrolized copolymers of n-vinylamide and acrylamide can also be utilized for deflocculants. This deflocculant is discussed in U.S. Pat. No. 4,921,621 which issued to Costello et al. on May 1, 1990. These patents are hereby incorporated by reference herein.

The slurrified drilling waste of this invention need not be injected continuously. A preferred method is to inject the slurrified drilling waste followed by a spacer volume of a saline solution. Once the slug of slurrified drilling wastes has reached the desired location, pressure is released which allows the fines to settle out and plug pores within the formation. This process can be repeated until the permeability of a formation has been decreased to the extent desired, or until it no longer will accept additional slurrified drilling waste.

Obviously, many other variations and modifications of this invention, as previously set forth, may be made without departing from the spirit and scope of this invention as those skilled in the art readily understand. Such variations and modifications are considered part of this invention and within the purview and scope of the appended claims.

What is claimed:

1. A method for disposing of drilling wastes comprising:
    a) dispersing drilling wastes with an aqueous saline solution thereby forming a drilling waste and saline mixture;
    b) injecting said mixture into an underground formation which is of a composition sufficient to contain said mixture;
    c) fracturing hydraulically said formation so as to allow continued injection of the drilling wastes at relatively low pressures into a created fracture in said formation and
    d) thereafter repeating hydraulic fracturing to reestablish communication with a disposal zone whenever a "skin" builds up due to filtration of solids within said formation.

2. The method as recited in claim 1 where in step a) said drilling waste comprises drilling fluids, drilled solids an drilling muds.

3. The method as recited in claim 1 where in step b) said mixture is injected into said formation via at least one disposal well which penetrates said formation.

4. The method as recited in claim 1 where in step b) said mixture is injected into a high permeability oil depleted zone of said formation.

5. The method as recited in claim 1 where in step a) the mixture contains a deflocculant which "shrinks" any hydrate bentonite particles entrained in said mixture which facilitates the disposal of mud solids.

6. The method as recited in claim 1 wherein in step a) the saline solution comprises sodium chloride, potassium chloride, or produced formation water.

7. A method for disposing of drilling wastes comprising:
    a) dispersing into an aqueous saline solution drilling wastes which comprise drilling fluids, drilled solids, or drilling muds and mixtures thereof where said saline solution comprises sodium chloride, potassium chloride, or produced formation water and mixtures thereof;
    b) injecting at fracturing pressures and rates said mixture into an underground formation which formation is of a composition sufficient to contain said mixture;
    c) fracturing hydraulically said formation so as to allow continued injection of the drilling wastes from step a) at relatively low pressures into a created fracture in said formation and
    d) thereafter repeating hydraulic fracturing to reestablish communication with a disposal zone whenever a "skin" builds up due to filtration of solids within said formation.

8. The method as recited in claim 7 wherein in step b) said mixture is injected into said formation via at least one disposal well which penetrates said formation.

9. The method as recited in claim 7 where in step b) said mixture is injected into a high permeability oil depleted zone of said formation.

10. The method as recited in claim 7 where hydraulic fracturing is repeated whenever a "skin" builds up due to filtration of solids within the formation so as to reestablish communication with a disposal zone.

* * * * *